(12) United States Patent
Harmon et al.

(10) Patent No.: US 12,339,390 B2
(45) Date of Patent: Jun. 24, 2025

(54) SOFTWARE BASED CLOUD COMPUTING RADAR

(71) Applicant: Envistacom, LLC, Atlanta, GA (US)

(72) Inventors: Jakob Harmon, Charlottesville, VA (US); Michael Beeler, Jefferson, MD (US)

(73) Assignee: APOTHYM TECHNOLOGIES GROUP, LLC, Peachtree Corners, GA (US)

( * ) Notice: Subject to any disclaimer, the term of this patent is extended or adjusted under 35 U.S.C. 154(b) by 866 days.

(21) Appl. No.: 17/109,819

(22) Filed: Dec. 2, 2020

(65) Prior Publication Data

US 2021/0173041 A1 Jun. 10, 2021

Related U.S. Application Data

(60) Provisional application No. 62/943,416, filed on Dec. 4, 2019.

(51) Int. Cl.
| | |
|---|---|
| *G01S 7/295* | (2006.01) |
| *G01S 7/41* | (2006.01) |
| *G01S 13/28* | (2006.01) |
| *H04L 67/10* | (2022.01) |
| *G06F 8/30* | (2018.01) |

(52) U.S. Cl.
CPC ............ *G01S 7/295* (2013.01); *G01S 7/414* (2013.01); *G01S 13/28* (2013.01); *H04L 67/10* (2013.01); *G06F 8/315* (2013.01)

(58) Field of Classification Search
CPC .......... G01S 7/295; G01S 7/414; G01S 13/28; G01S 7/003; H04L 67/10; G06F 8/315
See application file for complete search history.

(56) References Cited

U.S. PATENT DOCUMENTS

| | | | |
|---|---|---|---|
| 7,439,906 B1* | 10/2008 | Blunt | G01S 13/904 |
| | | | 342/134 |
| 9,110,169 B2* | 8/2015 | Stettner | B60R 21/0134 |
| 2017/0157766 A1* | 6/2017 | Kamhi | B25J 9/161 |
| 2019/0121357 A1* | 4/2019 | Zhang | G05D 1/0088 |
| 2020/0120458 A1* | 4/2020 | Aldana | H04W 4/40 |

OTHER PUBLICATIONS

High-Performance Computing_Datamation.pdf—from https://www.datamation.com/data-center/high-performance-computing/ (Year: 2019).*

* cited by examiner

*Primary Examiner* — Olumide Ajibade Akonai
*Assistant Examiner* — Yonghong Li
(74) *Attorney, Agent, or Firm* — McBee, Moore & Vanik IP, LLC

(57) ABSTRACT

An all-digital software-only radar using distributed processing resources of cloud computing is provided. In particular, all processes that were previously supported by purpose built software, firmware, Field Programmable Gate Array (FPGA) hardware description language (HDL) firmware, and an Application Specific Integrated Circuit (ASIC) are in the instant disclosure supported entirely by a High Performance Computing (HPC) server inside a cloud computing environment.

20 Claims, 11 Drawing Sheets

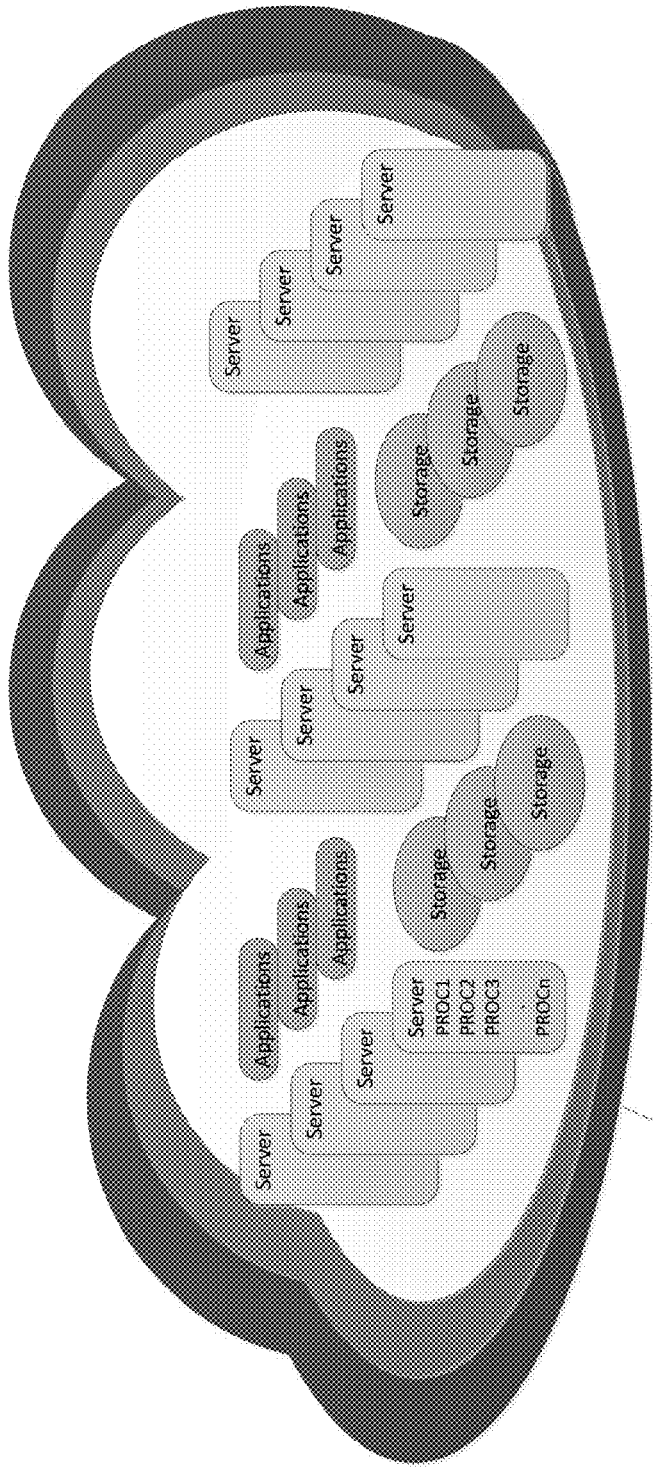

Transmitter Applications
PROC1 (Application/Process) = Address Generation
PROC2 (Application/Process) = LUT SIN/COS
PROC3 (Application/Process) = Digital Filtering
PROC4 (Application/Process) = Digital IF Framing
PROC5 (Application/Process) = Digital IF Network Frames/Packets Receiver Applications
PROC6 (Application/Process) = Digital IF Network Frames/Packets
PROC7 (Application/Process) = Digital IF De-framing
PROC8 (Application/Process) = Digital Filtering
PROC9 (Application/Process) = Beam Forming
PROC10 (Application/Process) = Pulse Compression
PROC11 (Application/Process) = Clutter / Doppler
PROC12 (Application/Process) = Detection / Tracking / Imaging

FIG 6

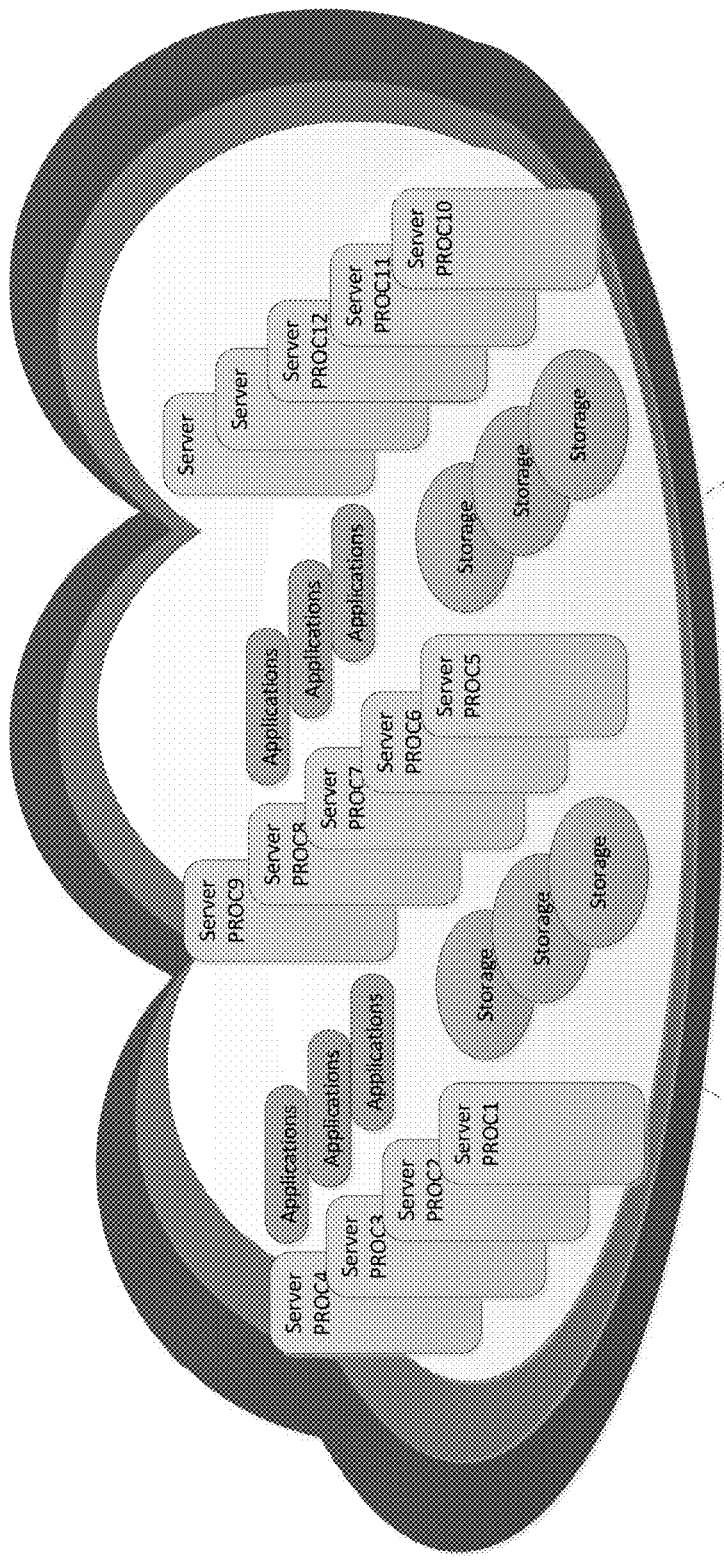

Transmitter Applications
PROC1 (Application/Process) = Address Generation
PROC2 (Application/Process) = LUT SIN/COS
PROC3 (Application/Process) = Digital Filtering
PROC4 (Application/Process) = Digital IF Framing
PROC5 (Application/Process) = Digital IF Network Frames/Packets Receiver Applications
PROC6 (Application/Process) = Digital IF Network Frames/Packets
PROC7 (Application/Process) = Digital IF De-framing
PROC8 (Application/Process) = Digital Filtering
PROC9 (Application/Process) = Beam Forming
PROC10 (Application/Process) = Pulse Compression
PROC11 (Application/Process) = Clutter / Doppler
PROC12 (Application/Process) = Detection / Tracking / Imaging

FIG 7

SOFTWARE BASED CLOUD COMPUTING RADAR

CROSS REFERENCE TO RELATED PATENT APPLICATIONS

This patent application claims priority to U.S. Provisional Patent Application No. 62/943,416, filed Dec. 4, 2019, the disclosures of each of which are herein incorporated in their entireties.

BACKGROUND

Since the introduction of radar, a purpose built device for radar has been utilized to generate a waveform and transmit over a medium, and receive the same waveform and process the signal. The intent is to extract information from the remotely sensed area regarding range, angle, and velocity of objects using RAdio Detection And Ranging (radar). A radar may contain both the transmit and receive portion, known as a monostatic radar. Or, the radar transmit portion may be in a separate system or location from the receive portion, known as a bistatic radar. Traditionally, a radar is a purpose built device using specialized parts with specialized software and/or firmware. As of the last few years, a new concept known as a software defined radar (SDR) has entered practice using a relatively generic printed circuit board (PCB) set with a general waveform generator and receiver board with the intent that a general processor can support a software package on a somewhat generalized radar set to create a radar.

FIELD

The described invention uses an "all software" approach for the creation of a radar within the distributed computing fabric known as "cloud computing" that is supported with commercial off the shelf (COTS) hardware know as High Performance Computing (HPC) servers. The HPC architectures are now being supported by the distributed processing companies such as Amazon Web Services (AWS), Google Cloud Computing, Microsoft's Azure, etc. The architectures being supported by the cloud computing companies are also known to support or enable software defined networking (SDN). The method described provides the ability for someone skilled in the art, e.g., a software architect, network engineer, or radar designer to understand the concepts described in this disclosure.

RELATED ART

This disclosure relates to methods of describing a radar signal processing system that is created using a high-level programming language such as OpenCL, C, C++, etc. and implementing the high-level programming language as an application on a cloud-based HPC platform within a distributed computing architecture. The described methods provide the description of how an all software radar can be created using a high-level computing language, and supported in a cloud-based architecture for the creation of a radar waveform using an all-digital computing device. The described method can be utilized to provide similar or higher performance in every aspect of a hardware or dedicated (purpose built) radar or a software defined radar (SDR) using the processing resources available within a cloud-based processing architecture. Furthermore, the described approach can perform the waveform processing in real time.

In the prior art, a typical radar system that supports ground based, vehicle, airborne, or weather radar is comprised of a signal processing chain that includes transmitters and receivers utilizing various coherent and non-coherent processing approaches. The transmitter portion of the radar performs the process of modulating the waveform into a signal that is suitable for the transmission medium. The actual process of generating the modulated signal is carried out by a purpose-built piece of hardware consisting of discrete components, logic devices, and low-level programming language to provide the directives for the hardware to accomplish the steps required to create the final waveform to be transmitted over the transmission medium. Conversely, the receiver portion of the radar performs data processing—again, all of these processes are carried out by a purpose built piece of hardware consisting of discrete components, logic devices, and low-level programming language to provide the directives for the hardware to accomplish the steps required to accept a waveform over the transmission medium and perform the steps to determine velocity, angle, and range of objects.

The present disclosure covers how the steps required to accomplish the radar signal processing chain may be accomplished in an all-digital cloud computing environment using COTS processing hardware without the need of any purpose-built hardware. The entire radar signal processing chain, may be accomplished in an all software radar using cloud computing fabric that would be used for a SDN network.

BRIEF SUMMARY

This disclosure relates to, but is not limited to, providing an all-digital software only radar using the distributed processing resources of cloud computing that is created using a high-level programming language. Traditionally, a typical radar system that supports ground based, vehicle, airborne, or weather radar is comprised of a signal processing chain that includes transmitters and receivers utilizing various coherent and non-coherent processing approaches. The transmitter portion of the radar performs the process of modulating the waveform into a signal that is suitable for the transmission medium. The actual process of generating the modulated signal is carried out by a purpose-built piece of hardware consisting of discrete components, logic devices, and low-level programming language to provide the directives for the hardware to accomplish the steps required to create the final waveform to be transmitted over the transmission medium. Conversely, the receiver portion of the radar performs data processing—again, all of these processes are carried out by a purpose built piece of hardware consisting of discrete components, logic devices, and low-level programming language to provide the directives for the hardware to accomplish the steps required to accept a waveform over the transmission medium and perform the steps to determine velocity, angle, and range of objects.

The disclosed invention uses the described techniques and results in one or more descriptions to support the creation and manipulation of an all software digital radar using the distributed nature of the cloud computing fabric using the resources available today and planned for the future. The cloud computing fabric is also utilized to provide resources for software defined networking.

Particular implementations described herein are and may use, but is not limited to programs, computer programming languages, microprocessors, Application Specific Integrated Circuits (ASICs), Field Programmable Gate Arrays (FP- GAs), and combinations of CPUs and FPGAs to form High Performance Computing (HPC) servers.

Aspects of this disclosure relate to a method and system for creating an all software digital radar using the distributed processing resources of cloud computing.

BRIEF DESCRIPTION OF THE DRAWINGS

FIG. 6 shows the described invention with all radar processes (PROC1, PROC2, and PROC3) being supported by a single cloud computing server.

FIG. 7 shows the described invention with all radar processes (PROC1, PROC2, and PROC3) being supported by a multiple cloud computing server lower left (PROC1), lower center server (PROC2), and lower right server (PROC3).

DETAILED DESCRIPTION

This disclosure, its aspects and implementations, are not limited to the specific processing techniques, components, modulation formats, frequency examples, or methods disclosed herein. Many additional components and assembly procedures known in the art consistent with the creation and manipulation of a waveform by a radar transmitter and receiver are in use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

Particular implementations of an all software digital radar as an application using cloud computing resources for a communications system is described. However, as will be clear to those of ordinary skill in the art from this disclosure, the principles and aspects disclosed herein may readily be applied to any monostatic or bistatic radar device known hereafter as a radar for the creation of a waveform to be carried over a transmission medium for Intermediate Frequency (IF) and Radio Frequency (RF) radar systems such as ground based, vehicle, airborne, or weather radar without undue experimentation.

Figure 1:
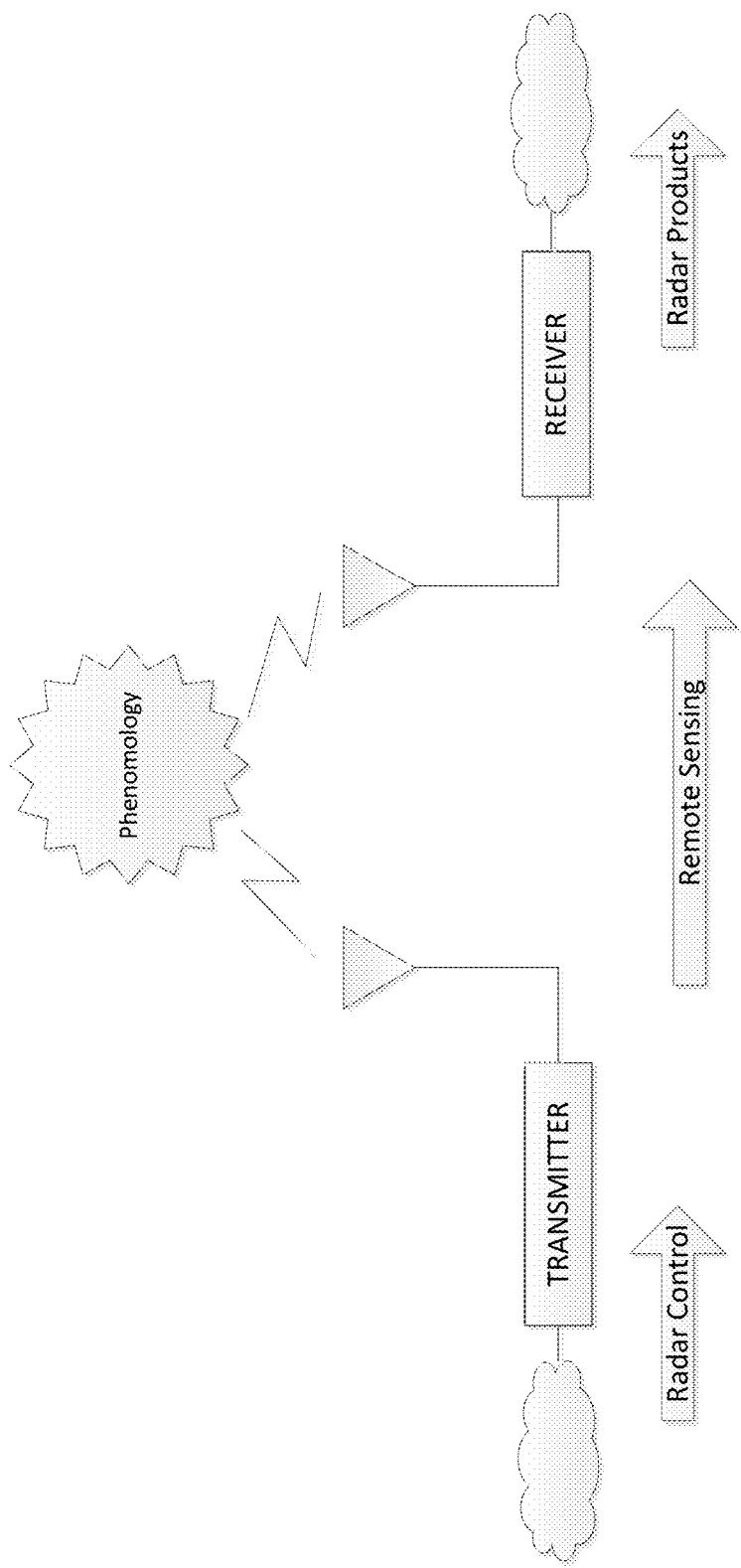
FIG. 1 shows the prior art using purpose built bistatic radar hardware for supporting a waveform.

FIG. 1 illustrates the prior art of a particular implementation of a bistatic radar system wherein the transmit station contains the radar transmitter and the receiver station contains the radar receiver. The radar system in the prior art is a purpose-built device, typically a dedicated "box" that transmits. The radar transmitter outputs either an intermediate frequency (IF) that may be unconverted to a radio frequency (RF) or directly output from the transmitter as a radio frequency, possibly power amplified, and transmitted through free-space where the energy is shifted by the remotely sensed objects. At the receive station, the receiver in the prior art is a purpose-built device, typically a dedicated "box." The waveform is received (inputs) either an intermediate frequency (IF) that may be down converted from a radio frequency (RF) or directly input from the receive antenna as a radio frequency signal.

Figure 2:
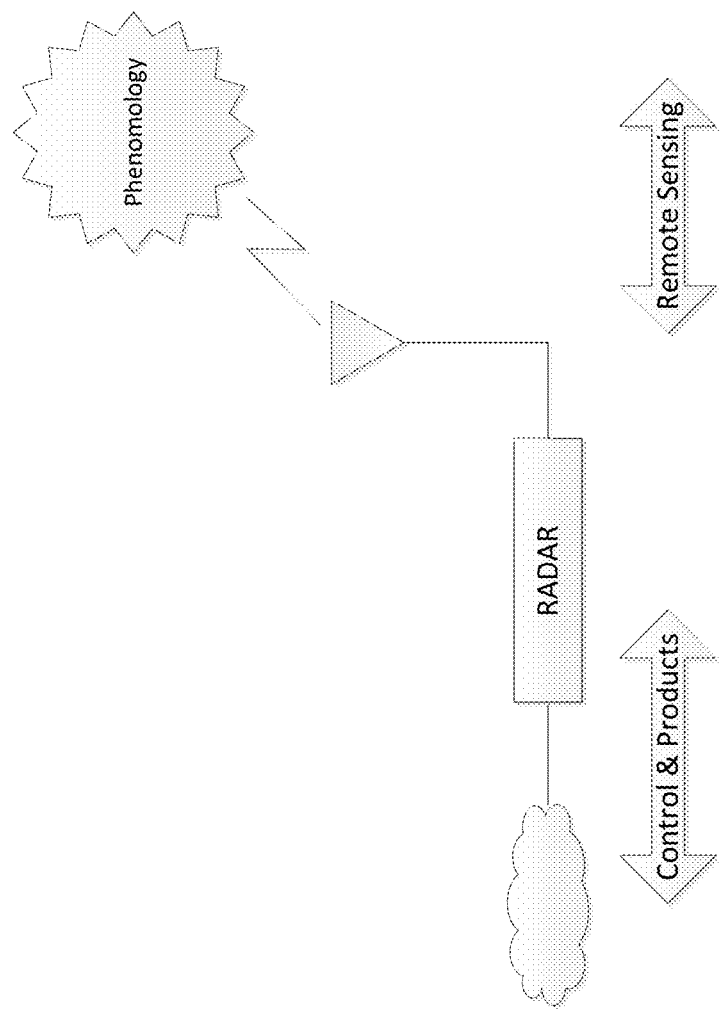
FIG. 2 shows the prior art using purpose built monostatic radar combination transmitter and receiver hardware for supporting a waveform.

FIG. 2 Is an alternate embodiment, of the prior art where the transmitter and receiver are combined in a single device, known as a monostatic radar.

Figure 3:
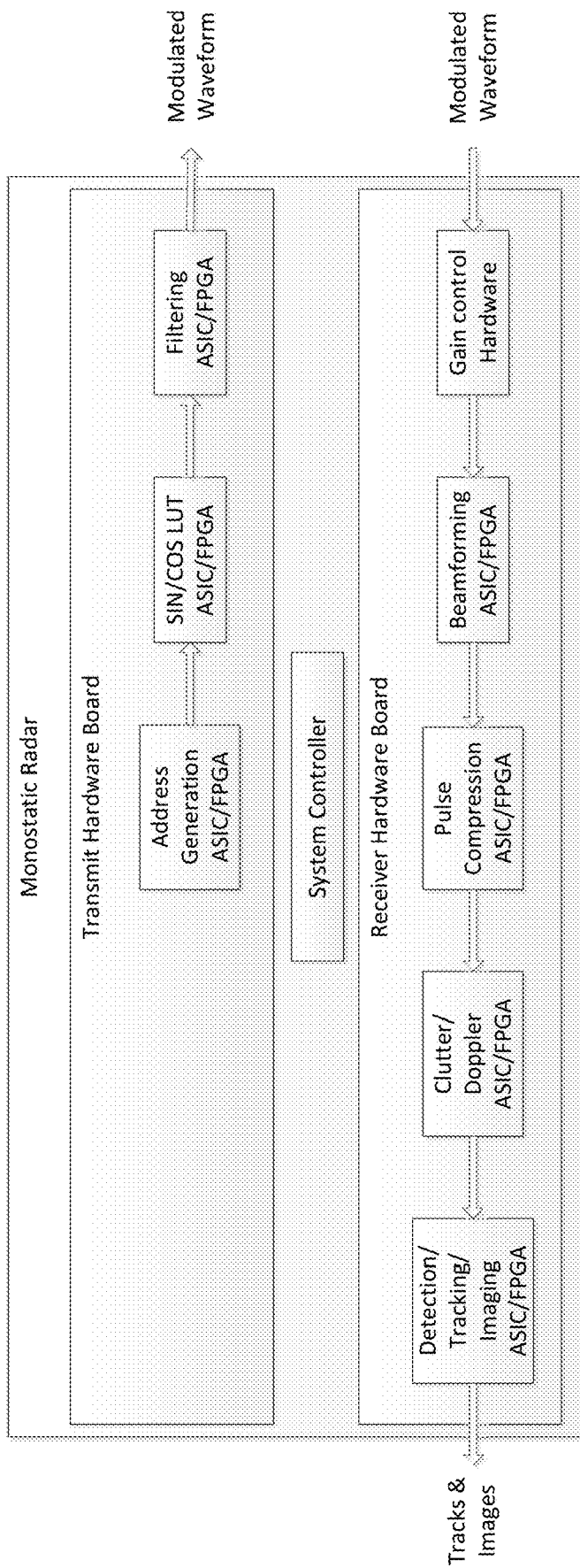
FIG. 3 shows the prior art of a radar's components to support the transmission and reception capabilities with purpose built hardware.

FIG. 3 shows the prior art with each component of a purpose-built radar using specialized hardware that comprises both the transmit and the receive path. The individual processing modules as specialized hardware devices and processing modules written in a low-level specialized hardware description language (HDL) is shown.

For the specialized box that is shown in FIG. 3, the top row of boxes (functions) show the various stages of the transmit hardware. The user configuration starts the Look-Up Table (LUT) address generation process, where the address is generated by an Application Specific Integrated Circuit (ASIC) or FPGA using a HDL language. The next stage is the SIN/COS LUT data, which is programmable memory where a copy of the whole transmit waveform is stored. In many implementations, this function is a dedicated hardware device, ASIC or FPGA using a HDL language. The modulated waveform is then filtered with a digital filter implemented in an ASIC or FPGA using a HDL language. In the specialized transmitter section of a radar, the output then flows to a Digital to Analog Converter (DAC) or to a digital output stream to another stage of processing via Ethernet (frames) and IP (packets). The entire process must pass between multiple technologies of ASIC, FPGA using a HDL language, discrete components, etc. before a final waveform has been created. Continuing with FIG. 3, the receive chain processes the received waveform. First it is assumed an Analog to Digital Converter (ADC) has accepted an incoming analog waveform and digitized the signal or the signal was received over a digital stream such as Ethernet (frames) and IP (packets). The input on the bottom row, right side show the first step is to perform gain control and is performed by a hardware device to add amplification or attenuation. The next step is to perform the beamforming operation to form a directed gain pattern, applicable when the radar antenna is an array. This step is performed by an ASIC or FPGA using a HDL language. The next step is to pass the stream to a pulse compression to concentrate received energy in a short duration. The pulse compression is typically carried out by an ASIC or FPGA using a HDL language. Next, clutter and doppler processing are applied to improve the detectability of moving objects by suppressing interference from clutter returns, and is performed by an ASIC, FPGA using a HDL language, or a system processor. The next step is application dependent, and requires detection, tracking, and/or synthetic image processing to pass to the user the recovered moving target tracks and/or synthetic images.

As shown in FIG. 3, the entire configuration of the radar is controlled by a system controller. The system processor is a dedicated hardware device that controls the entire radar. The system controller (control processor) manages the entire unit's health, status, configuration, setup, error checking and in many cases performs the user interface.

FIG. 3 can also be used to describe a new technique called Software Defined Radar (SDR). Similar to a dedicated radar, the SDR technology supported by GNU Radio and companies such as Ettus Research, these are dedicated hardware boards that are purpose built to support many types of waveforms, but ultimately rely on a dedicated/purpose built piece of processing hardware to support waveform processing.

Figure 4:
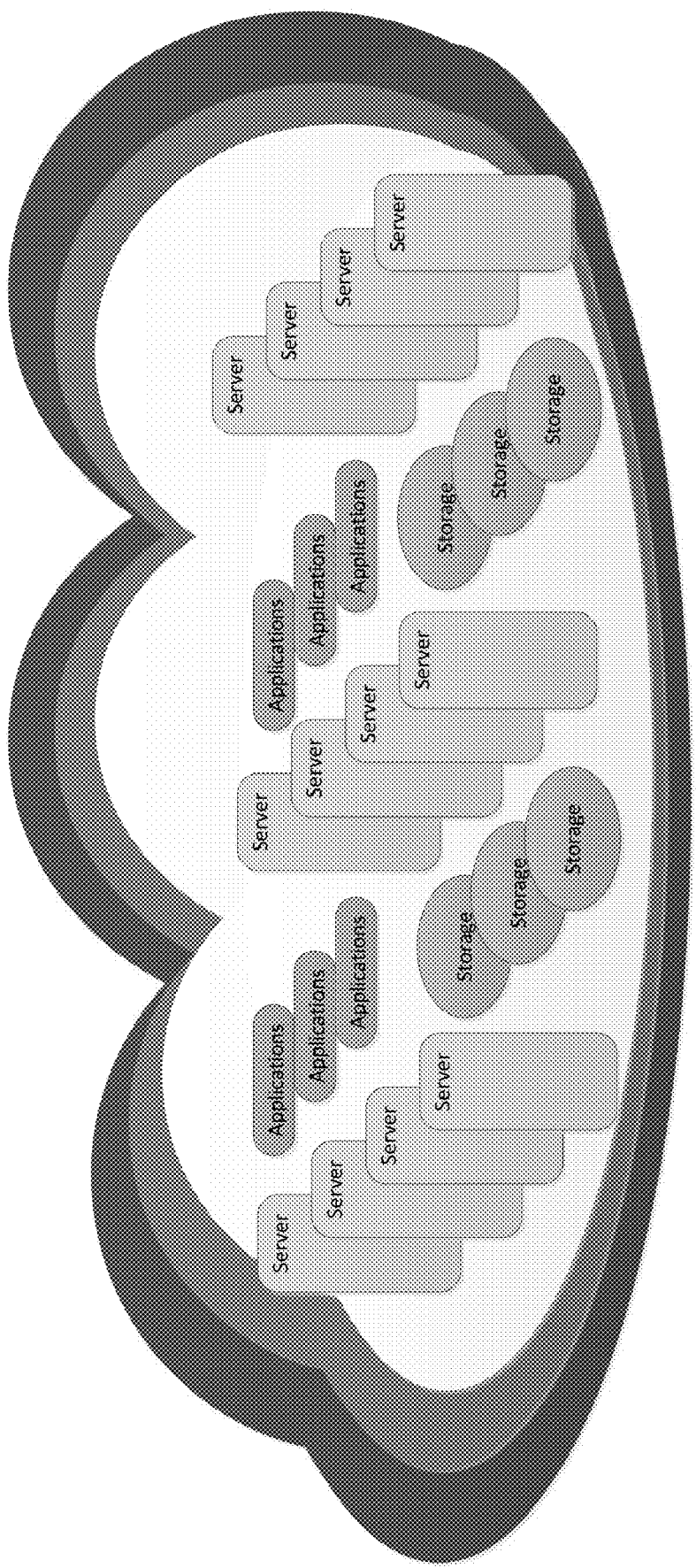
FIG. 4 shows the cloud computing fabric containing servers (processors), storage, applications, etc.

FIG. 4 shows the high-level representation of cloud computing environment. As shown, the cloud computing or distributed processing architecture has moved all processing, applications, and storage into the cloud. Companies such as Amazon Web Services (AWS), Microsoft Azure, Google Cloud Computing, etc. are developing massive infrastructures as depicted in FIG. 4, and is commonly called a SDN.

Figure 5:
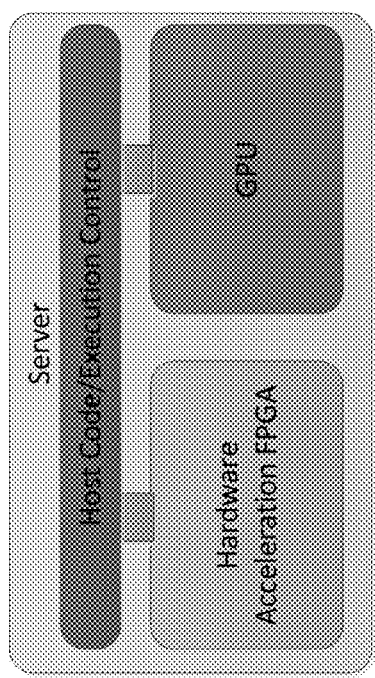
FIG. 5 shows the next generation HPC server technology containing a CPU/GPU and hardware acceleration card.

FIG. 5 shows the next generation server/processor architecture. No longer can CPU/GPU based PC's processors keep up with the processing demands of the user data/information required to be handled by the Internet. Instead, the cloud computing providers are adding hardware assisted modules to their servers, e.g. Amazon Web Services F1 architecture as well Microsoft's Azure. These new HPC architectures with hardware assist now offer the hardware acceleration capabilities to support real-time high-speed processing for SDN environments. With these new hardware processing enhancements, a new computing language has been introduced called OpenCL. OpenCL has been introduced to allow the code to be written in a high level of abstraction that is hardware agnostic, and can take advantage of hardware acceleration technology in servers in a distributed computing environment. The described invention uses OpenCL, but any high-level language capable of supporting the combined processing of a CPU/GPU with hardware assistance would be covered by covered by the described invention.

FIG. 6 shows the novelty of the invention where all processes that are supported by purpose built software, firmware, FPGA HDL firmware, and an ASIC are being supported entirely by a the HPC server inside the cloud computing environment. The processes shown on FIG. 6 PROC1, PROC2, and PROC3 are representations of the various radar processes. It should be noted the PROC1, PROC2, PROC3, PROCn (processes and/or applications) are functional blocks or algorithms running on the CPU (x86) or any one of the hardware acceleration units, such as FPGA, GPU, or DSP, that combined constitute the implementation of a communications waveform. The functional blocks are targeted for particular HPC resource according to the performance profiling of the waveform, which identifies algorithms that need to be hardware accelerated to achieve performance comparable to purpose built hardware. The process representing the radar processes/applications are as follows:

PROC1 (application/process) generates the appropriate addressing to generate the radar waveform as configured by the user.

PROC2 generates the waveform by outputting from SIN and COS LUTs where the complete complex baseband, in-phase and quadrature parts, waveform data is stored. This function replaces the dedicated hardware device or an ASIC and is entirely supported by a high-level software language (i.e. OpenCL) and by the HPC architecture.

PROC3 applies any digital filtering or adjustments to the transmit modulated waveform. This replaces the firmware function supported by an ASIC or FPGA using a HDL language with a function known as a serializer and is entirely supported by a high-level software language (OpenCL) targeting the HPC architecture.

Figure 8:
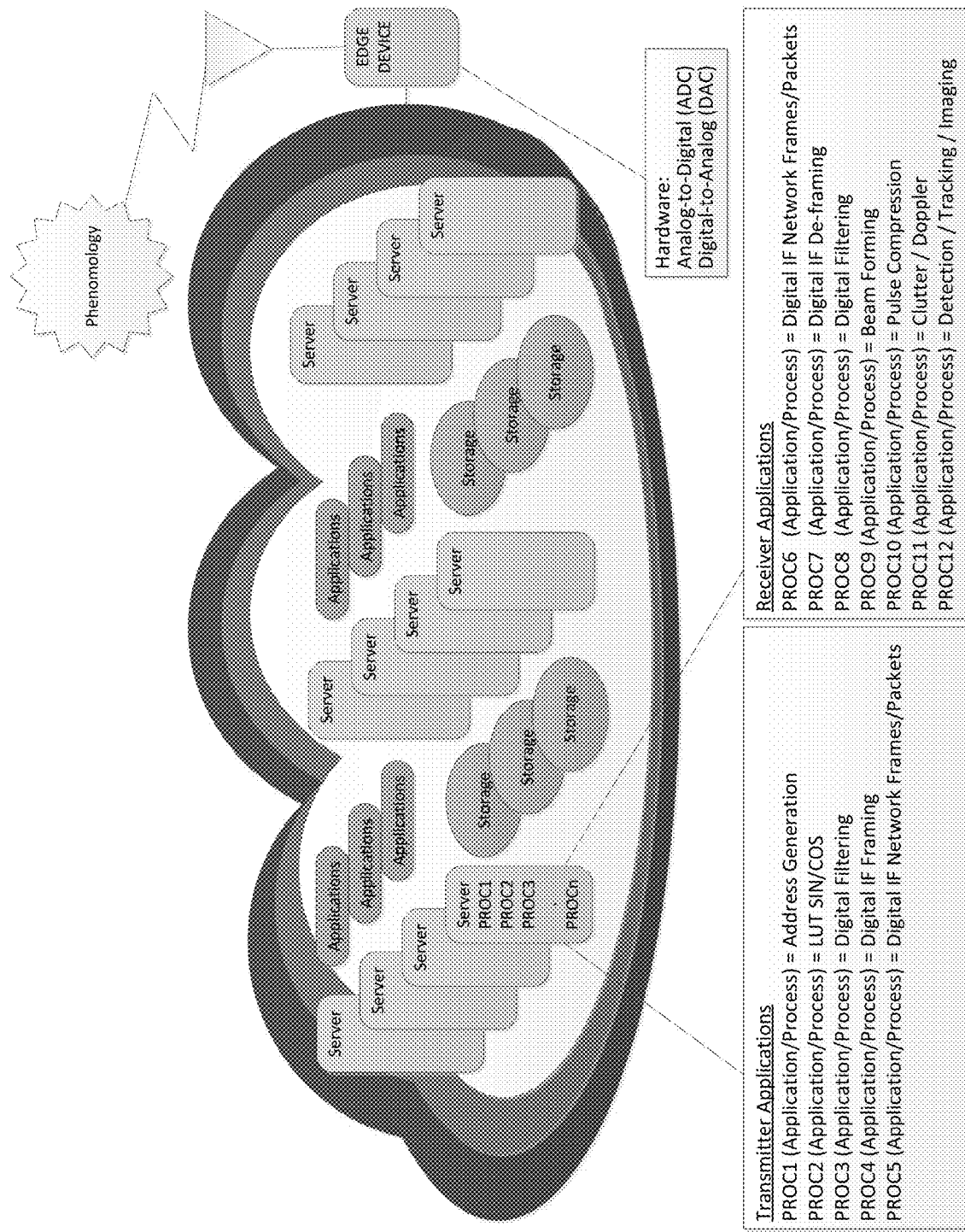
FIG. 8 shows the described invention with all radar processes (PROC1, PROC2, PROC3, and PROCn) being supported by a single cloud computing server and passed to an edge device for converting the digital stream of transmit signal created in the cloud computing environment passed to an edge processing device.

In the specialized transmitter section of a radar, the output then flows to a Digital to Analog Converter (DAC) or to a digital output stream to another stage of processing via Ethernet (frames) and IP (packets). FIG. 8 is an alternate embodiment, an edge device can be placed on the edge of the cloud computing architecture, and egresses to a conversation device where it is then converted from an entirely digital format to an analog format suitable for transmission.

Continuing with FIG. 6, the receive chain processes the received waveform. In FIG. 6, the PROCn processes can be any function that is desired in any order for providing the various stages of waveform processing within the cloud computing environment. As previously described, the receive section can operate with a previously digitized waveform from another source in the cloud computing environment. As shown in FIG. 3, the input on the bottom row, right side shows the first step is to perform gain control and is performed by a hardware device to add amplification or attenuation. This function replaces the gain/attenuation control provided by a hardware device, and is replaced by an application/process by a high-level software language (OpenCL) and is supported by the HPC architecture. The next step is to perform the beamforming operation to form a directed gain pattern, applicable when the radar antenna is an array. This step is performed by an ASIC or FPGA using a HDL language, and is replaced by an application/process, a high-level software language (OpenCL) and is supported by the HPC architecture. The next step is to pass the stream to a pulse compression to concentrate received energy in a short duration. The pulse compression is typically carried out by an ASIC or FPGA using a HDL language, and is replaced by an application/process, a high-level software language (OpenCL) and is supported by the HPC architecture. Next, clutter and doppler processing are applied to improve the detectability of moving objects by suppressing interference from clutter returns, and is performed by an ASIC, FPGA using a HDL language, or a system processor, and is replaced by an application/process, a high-level software language (OpenCL) and is supported by the HPC architecture. The next step is application dependent, and requires detection, tracking, and/or synthetic image processing to pass to the user the recovered moving target tracks and/or synthetic images. This step is performed by an ASIC or FPGA using a HDL language, and is replaced by an application/process, a high-level software language (OpenCL) and is supported by the HPC architecture.

FIG. 8 shows an alternate embodiment, an edge device Analog to Digital Converter (ADC) has accepted an incoming analog waveform and digitized the signal or the signal was received over a digital stream such as Ethernet (frames) and IP (packets) before passing the digitized waveform into the cloud computing environment.

Figure 9:
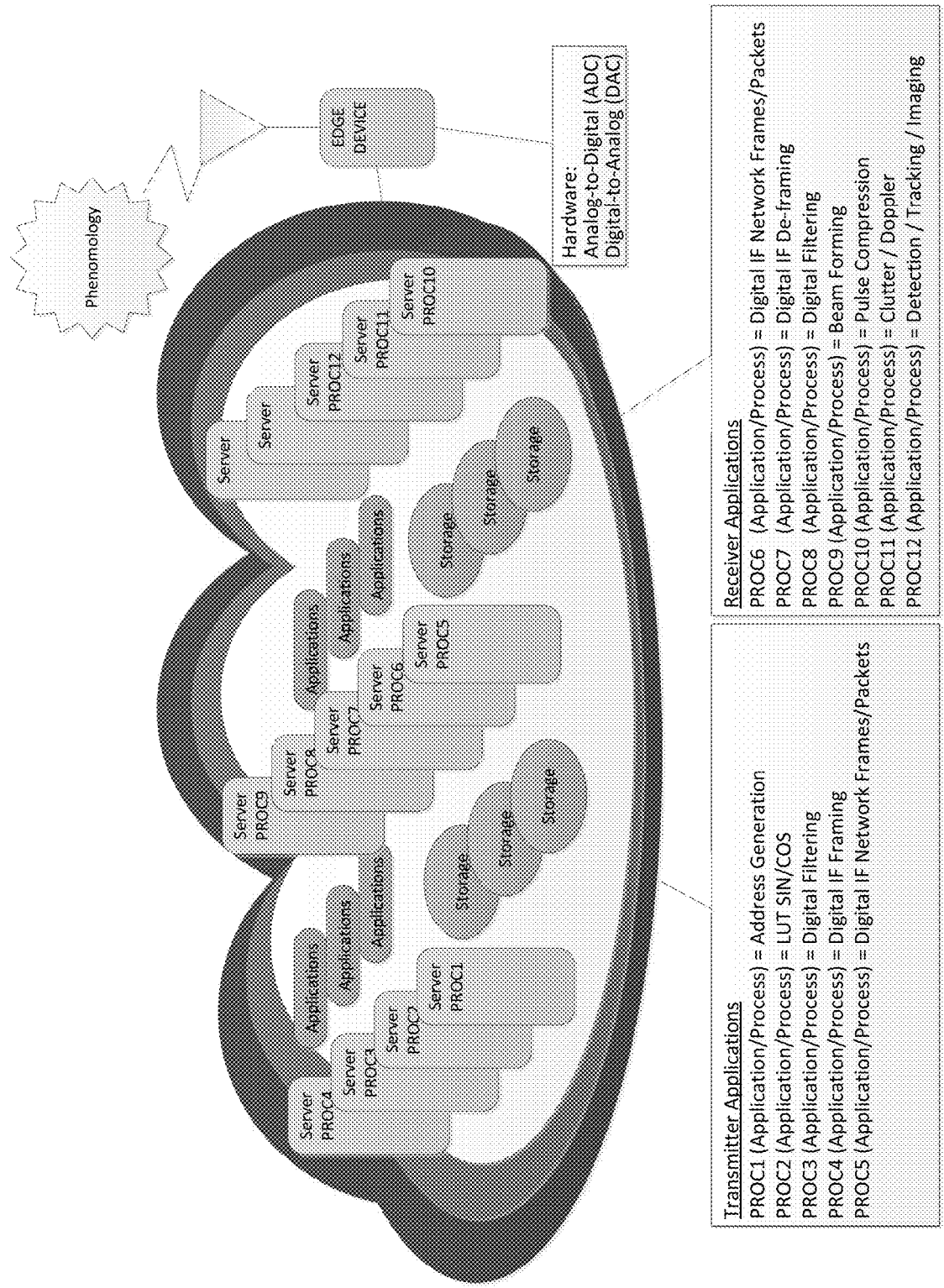
FIG. 9 shows the described invention with all radar processes (PROC1, PROC2, and PROC3) being supported by a multiple cloud computing server lower left (PROC1), lower center server (PROC2), and lower right server (PROC3), and several applications/processes being supported on other servers for PROC4 and PROC5) and passed to an edge device for converting the digital stream of transmit signal created in the cloud computing environment for transmission over the medium.

FIG. 7 shows an alternate embodiment where the processes may be supported by a separate processor (hardware or virtual) in them physical location or different location, using the same HPC architecture or different architecture, and same or different CPU architectures. FIG. 9 represents an edge device supporting the distributed processing of FIG. 7. It is noteworthy, the architectures of FIGS. 4, 6, 7, 8, 9, 10, and 11 showing the processing of the waveform may be completely flexible.

An external clock reference can be incorporated as an input to the transmitter subsystem, the receiver subsystem, and the edge device as a common network clock reference.

Figure 10:
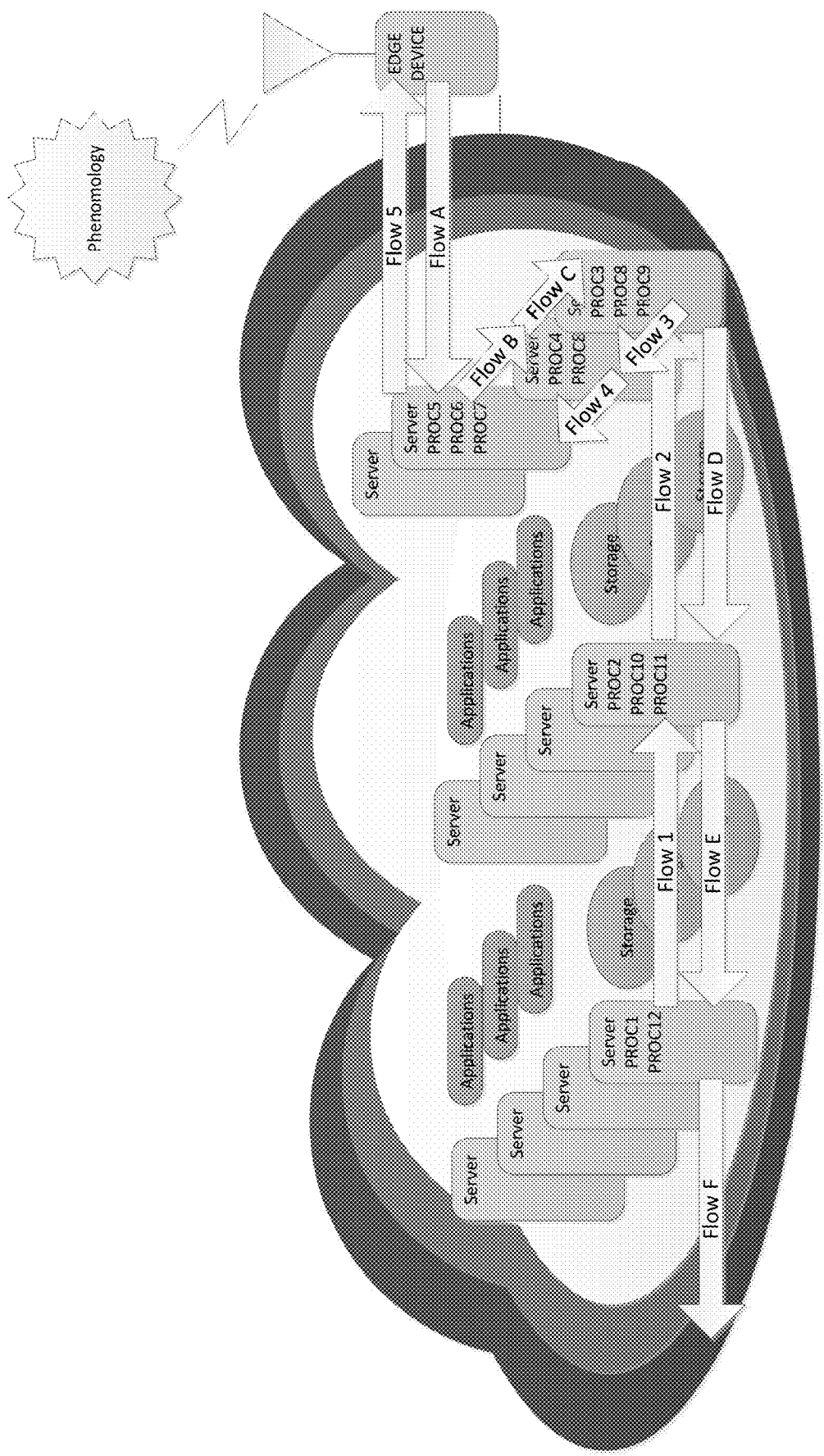
FIG. 10 shows the described invention with all radar processes (PROC1 to PROC5 for the forward and PROC 6 to PROC 12 for the return path) being supported by a multiple cloud computing servers with flows between each of the processes residing on multiple servers distributed throughout the cloud.
Figure 11:
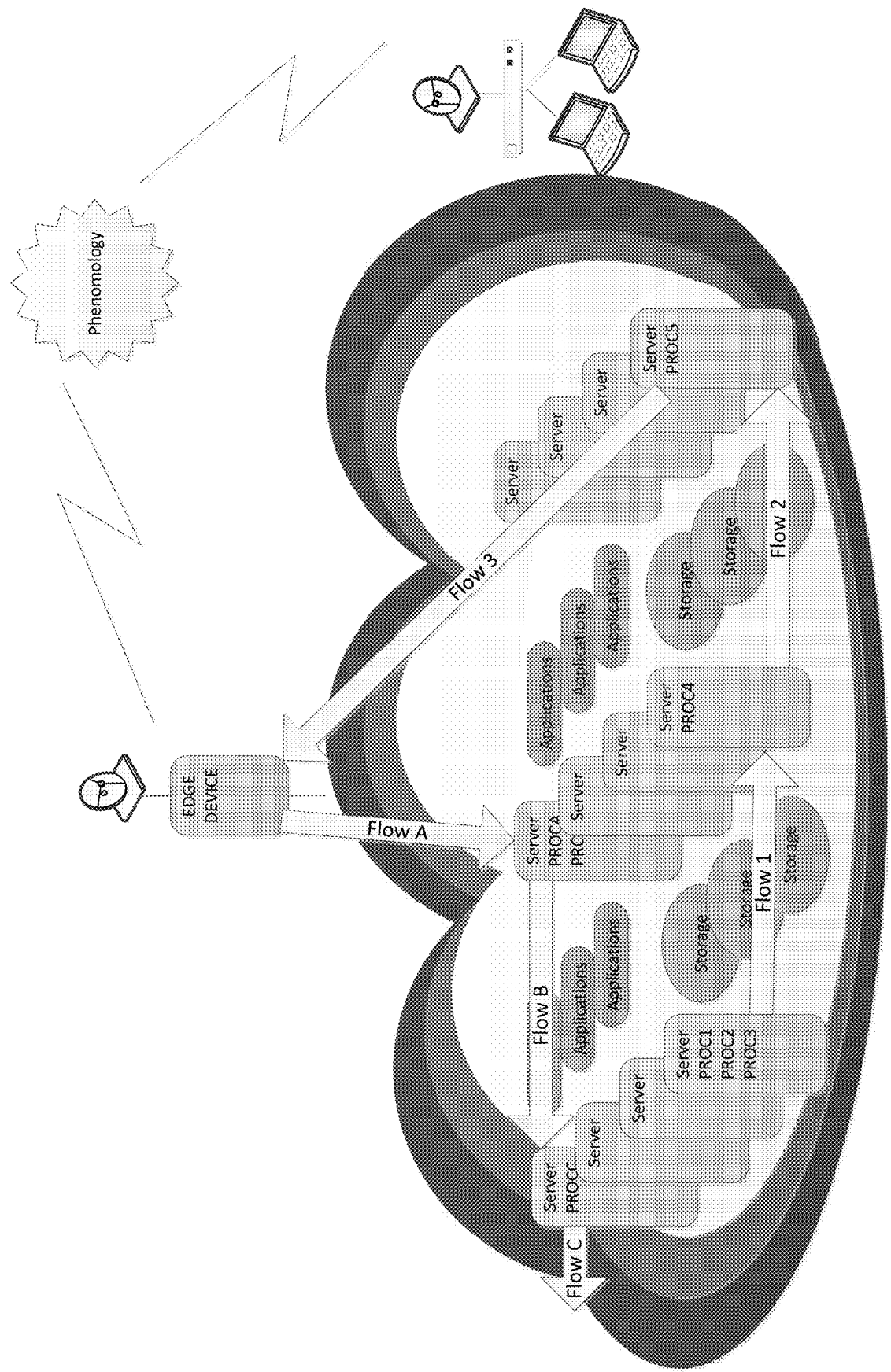
FIG. 11 shows the described invention with all radar processes (PROC1 to PROC5 for the forward path and PROCA to PROCC for the return path) being supported by multiple cloud computing servers with flows between each of the processes residing on multiple servers distributed throughout the cloud.

FIG. 10 shows the novelty of the invention where all processes are distributed throughout the cloud computing environment. PROC1 generates the appropriate addressing to generate the radar waveform as configured by the user. Flow 1 represents the addresses being issued from PROC1 to where they address SIN and COS LUTs in PROC2. FIG. 10 does not explicitly show a timing process, but the network packets being passed between each of the servers and processes in the cloud computing environment must have a timestamp for all packets, so it is clearly understood that in the control header of the all the information being moved from process to process has a high-resolution time stamp that maybe used such, but not limited to, the Real Time Protocol (RTP), etc.

Flow 2 directs the in-phase and quadrature waveform data from PROC2 to process PROC3 that applies digital filtering to the transmit modulated waveform.

Flow 3 directs the waveform from PROC3 to process PROC4 where digital IF framing is applied.

Flow 4 directs the digital IF famed data from PROC4 to process PROC5 that generates digital IF network frames/packets.

Flow 5 directs the digital IF data from PROC5 to an edge device where it is accepted and transmitted to over an IF or RF radio link.

Each of the processes PROC1 to PROCn are shown as representations of the ability to process a waveform and is not meant to show the exact sequence or process how any one waveform would be processed.

In a preferred embodiment, the entire waveform creation, processing, manipulation, etc. that is traditionally supported by a purpose built device or a semi-purpose built hardware platform to support a software defined radar (SDR) that relies on purpose or semi-purpose built hardware can be entirely replaced by a cloud computing application implemented in a high-level coding language such as, but not limited to OpenCL or starting with an ISO C99 high-level programming language such as C, C++, etc. and converting to OpenCL (or similar language). Any and all functions that could be supported by a purpose built transmitter or can be created or represented as a high-level programming language and supported on a HPC device inside a cloud computing environment. The entire architecture may be supported as a 100% digital waveform representation that is supported by a single hardware server with all processes being brought to bear on the waveform to form a transmitter, receiver, weather monostatic or bistatic, or passed server to server and a process (one or more) acts on the waveform as it traverses the cloud computing environment. It should be noted that the PROC1, PROC2, PROC3, PROCn (processes and/or applications) are functional blocks or algorithms running on the CPU (x86) or any one of the hardware acceleration units, such as FPGA, GPU, or DSP, that combined constitute the implementation of a radar waveform. The functional blocks are targeted for particular HPC resource according to the performance profiling of the waveform, which identifies algorithms that need to be hardware accelerated to achieve performance comparable to purpose built hardware.

The benefits of the described invention over the purpose built radar or purpose built SDR board is as follows:
  Provides a resilient architecture—if a path becomes compromised, the path is rerouted through additional resources with the cloud computing environment.
  Provides redundant waveform processing resources—if a path or server becomes unavailable, it is rerouted through additional resources with the cloud computing environment.
  Provides nearly unlimited waveform processing power—if a waveform being processed reaches the limit of processing on a server, then the resources of another server or servers within the cloud computing environment.
  Provides ephemeral operation—if the waveform process is only required for use for brief period of time, the waveform may be processed and torn down forever, brief period of time (repeated), or moved to a new location.
  Provides an abstracted hardware platform—the high-level waveform processing may be performed in a manner that is not dependent on the hardware resources of a particular server or manufacturer's technology.
  Provides a secure processing environment—the specifics, complexities, and resources are not exposed to the outside world and are not able to be physically stolen or exposed to an unfriendly person, organization, or adversary In an alternate embodiment, the entire waveform creation, processing, manipulation, etc. that is traditionally supported by a purpose built device or a semi-purpose built hardware platform to support an SDR can be entirely replaced with a cloud computing application implemented in a high-level coding language such as, but not limited to OpenCL or starting with C, C++, etc. and converting to OpenCL (or similar language) and each processing function. Any and all functions that could be supported by a purpose built transmitter or receiver can be created or represented as a high-level programming language and supported on a HPC device inside a cloud computing environment. At the end of the waveform creation or waveform reception, an edge device may be used to perform the conversion to and from an analog format. For the transmit chain, the resulting all-digital waveform would be converted from all-digital to an analog format by the edge device by a hardware device known as a Digital to Analog Convert (DAC). Conversely, for the receive chain, the edge device would receive an analog signal and then cover the analog signal to digital with a hardware device known as an Analog to Digital Converter (ADC). Once the conversion process has been performed, the entire process and flow would be as is described in this disclosure.

The interface between the final cloud computing module and the edge device requires a framing format that provides for ensuring the messages being sent between the cloud computing environment and the edge device. The messages are:

- Directed to the correct destination or received from a known edge device
- Error free operation which may require FEC protection on the data flow
- Sequential order of all data with no missing or out of order frames/packets
- Time stamping of all data or a known amount of time/delay can be accounted for to ensure frames/packets containing digital waveform I/O data are not arriving too late or overflowing, and forwarded to the edge device in real time
- Encrypted data flows may be utilized
- A flow control mechanism may be utilized to slow down or speed up the passing of digital I/O data The benefits the described invention over the purpose built radar or purpose built SDR board is as follows:

- Provides an edge device that can be placed at any location with access to the Internet or cloud edge.
- Provides an architecture that scales as the processing technology improves. The edge device is simply a conversion device and will convert a waveform encoded as a digital stream (I/O samples) to or from the final analog format. The complexity of the waveform processing remains within the cloud computing fabric.
- Provides a secure processing environment—only the modulated digital I/O waveform data is required to pass to and from the edge device while the complexities and resources are not exposed to the outside world and are not able to be physically stolen or exposed to an unfriendly person, organization, or adversary.

EXAMPLES

The following are particular implementations with optimization techniques for all-digital cloud computing radar and the use of these methods are provided as non-limiting examples.

Example 1

A user requires a radar waveform to be transmitted from one radar station to be received by another radar station. The IP cores (processes) are distributed throughout the cloud computing environment. All components that comprise a complete digital radar are established and initialized and digital sampled I/O waveform data connection is established to a radar station with all-digital I/O capability. The area of interest is remotely sensed by the waveform and the energy is detected by the receiving radar station. The all software digital radar (created by the cloud computing IP cores application/process) is enabled and a bistatic radar system is established to the end user to receive tracking and/or synthetic imagery data. The output products of tracking and/or synthetic imagery data are stored in a storage device within the cloud computing environment.

Example 2

In particular implementations of the system described in example 1, a return path may be established to the same radar station where the digital I/O waveform stream is received to provide the end user tracking and/or synthetic imagery data.

Example 3

The virtualized radar system could be utilized to either track, measure the speed, determine the trajectory, capture synthetic imagery, and/or identify the size of a flying aircraft or rocket. All components that comprise a complete digital radar are established and initialized and digital sampled I/O waveform data connection is established to a radar station with all-digital I/O capability. The aircraft or rocket is remotely sensed by the waveform and the energy is detected by the receiving radar station. The all software digital radar (created by the cloud computing IP cores application/process) is enabled and a bistatic radar system is established to the end user to receive tracking and/or synthetic imagery data.

Example 4

In particular implementations of the system described in example 3, a return path may be established from the originating radar system over free space. There the digital I/O stream bearing information about the aircraft or rocket is received so the end user can obtain tracking and/or synthetic imagery data.

Example 5

The virtualized radar system carried by an aircraft could be utilized to either track, measure the speed, determine the trajectory, capture synthetic imagery, and/or identify the size of a ground target. All components that comprise a complete digital radar are established and initialized and digital sampled I/O waveform data connection is established to an airborne radar system with all-digital I/O capability. A return path may be established back to another airborne radar system over free space. There the digital I/O stream bearing information about the ground targets is received so the end user can obtain tracking and/or synthetic imagery data.

Example 6

In particular implementations of the system described in example 5, a return path may be established from the originating airborne radar system over free space. There the digital I/O stream bearing information about the ground target is received so the end user can obtain tracking and/or synthetic imagery data.

Example 7

The virtualized radar system carried by a spacecraft could be utilized to track meteorological weather patterns. All components that comprise a complete digital radar are established and initialized and digital sampled I/O waveform data connection is established to the space based radar system with all-digital I/O capability. A return path may be established back to the different receiving radar system over free space. There the digital I/O stream bearing information about the weather patterns is available to the end user for processing.

Example 8

In particular implementations of the system described in example 7, a return path may be established from the originating space based radar system over free space. There the digital I/O stream bearing information about the meteorological weather patterns is received for additional processing by the end user.

What is claimed is:

1. A cloud supported radar system comprising:
a transmit subsystem including;
an address application for a sine (SIN) and cosine (COS) look-up-table (LUT) based on a user configuration;
a waveform application, wherein the SIN and COS LUT is addressed to output a complete in-phase and quadrature portions of a complex-baseband transmit waveform;
a filter application programmed to electronically filter a modulated user data stream; and,
a digital-to-analog converter configured to convert the modulated user data stream into a first analog modulated communication waveform;
wherein the address application, the waveform application, and the filter application are programs written in high-level software language and supported by at least one server in at least one cloud environment; and,
a receiver subsystem programmed to receive an analog modulated radar waveform including:
an analog-to-digital signal converter configured to convert the received analog modulated radar waveform;
a gain/attenuation application;
a beamforming application to form a directed gain pattern in response to a radar antenna being an array;
a pulse compression application to improve a detectability of moving objects by suppressing interference from clutter returns; and,
an image application to perform a detection, a tracking, and/or a synthetic image processing;
wherein the gain/attenuation application, the beamforming application, the pulse compression application, and the image application are programs written in high-level software language and supported by at least one server in at least one cloud environment,
wherein the high-level software language comprises OpenCL.

2. The cloud supported radar system of claim 1 further comprising an edge device, wherein the edge device transmits the first analog modulated communication waveform and receives the analog modulated radar waveform after remotely sensing an area of interest.

3. The cloud supported radar system of claim 2, wherein the first analog modulated communication waveform is a stream of packetized digital I/Q samples, and wherein the stream of packetized digital I/Q samples are encapsulated in a frame format and forwarded in real time to the edge device.

4. The cloud supported radar system of claim 2 further comprising an external clock reference, wherein the external clock reference is an input to the transmitter subsystem, the receiver subsystem, and the edge device as a common network clock reference.

5. The cloud supported radar system of claim 1 further comprising a storage device storing output products of tracking and/or synthetic imagery data.

6. The cloud supported radar system of claim 1, wherein each of the transmitter subsystem and the receiver subsystem applications is supported by a high performance computing (HPC) server using a single CPU.

7. The cloud supported radar system of claim 1, wherein each of the transmitter subsystem and the receiver subsystem applications is supported by an HPC server using at least one CPU and at least one hardware acceleration device.

8. The cloud supported radar system of claim 1, wherein each of the transmitter subsystem and the receiver subsystem applications is distributed across a plurality of HPC servers comprising at least one or more CPUs and at least one or more hardware acceleration devices.

9. The cloud supported radar system of claim 1 further comprising an external clock reference, wherein the external clock reference is an input to the transmitter subsystem and the receiver subsystem as a common network clock reference.

10. The cloud supported radar system of claim 1, wherein the applications of each of the transmitter subsystem and the receiver subsystem support a plurality of radar waveforms.

11. A cloud supported radar system comprising:
a transmit subsystem including:
an address application for a sine (SIN) and cosine (COS) look-up-table (LUT) based on a user configuration;
a waveform application wherein the SIN and COS LUT is addressed to output a complete in-phase and quadrature portions of a complex-baseband transmit waveform; and
a filter application configured to electronically filter a modulated user data stream;
wherein the address application, the waveform application, and the filter application are first application processes written in a high-level software language, and wherein the first application processes are running on at least one high-performance computing (HPC) architecture in at least one cloud environment; and
a receiver subsystem programmed to receive an analog modulated radar waveform including:
a gain/attenuation application;
a beamforming application to form a directed gain pattern in response to a radar antenna being an array;
a pulse compression application to improve a detectability of moving objects by suppressing interference from clutter returns; and
an image application to perform a detection, a tracking, and/or a synthetic image processing;
wherein the gain/attenuation application, the beamforming application, the pulse compression application, and the image processing application are second application processes written in the high-level software language, and wherein the second application processes are running on at least one high-performance computing (HPC) architecture in the at least one cloud environment;
wherein at least the first application processes or the second processes are distributed throughout a plurality of HPC architectures in the at least one cloud environment;
wherein the high-level software language comprises OpenCL, C, and C++.

12. The cloud supported radar system of claim 11 further comprising an edge device, wherein the edge device transmits a first analog modulated communication waveform and receives the analog modulated radar waveform after remotely sensing an area of interest.

13. The cloud supported radar system of claim 12, wherein a transmit radar waveform is a stream of packetized digital I/Q samples; and, wherein a first stream of I/Q samples are encapsulated in a frame format and forwarded in real time to the edge device.

14. The cloud supported radar system of claim 12, wherein the edge device is configured to convert the modulated user data stream into the first analog modulated communication waveform, and to convert the received analog modulated radar waveform to an all-digital waveform.

15. The cloud supported radar system of claim 12, wherein the edge device is communicably coupled to the cloud supported radar system via a network.

16. The cloud supported radar system of claim 15, wherein the network comprises an internet.

17. The cloud supported radar system of claim 16, wherein a return path is established back to a different receiving radar system over free space.

18. The cloud supported radar system of claim 16, wherein a return path is established from an originating space based radar system over free space.

19. The cloud supported radar system of claim 11, wherein the HPC architecture comprises at least one CPU and at least one hardware acceleration device.

20. The cloud supported radar system of claim 11, wherein the first application processes and the second application processes support a plurality of radar waveforms.

* * * * *